(12) United States Patent
Sanjar

(10) Patent No.: US 11,727,701 B2
(45) Date of Patent: *Aug. 15, 2023

(54) TECHNIQUES TO DETERMINE DOCUMENT RECOGNITION ERRORS

(71) Applicant: STATE STREET CORPORATION, Boston, MA (US)

(72) Inventor: Amir Sanjar, Boston, MA (US)

(73) Assignee: STATE STREET CORPORATION, Boston, MA (US)

(*) Notice: Subject to any disclaimer, the term of this patent is extended or adjusted under 35 U.S.C. 154(b) by 37 days.

This patent is subject to a terminal disclaimer.

(21) Appl. No.: 17/461,088

(22) Filed: Aug. 30, 2021

(65) Prior Publication Data

US 2021/0390299 A1    Dec. 16, 2021

Related U.S. Application Data

(63) Continuation of application No. 16/373,423, filed on Apr. 2, 2019, now Pat. No. 11,106,908.

(51) Int. Cl.
*G06V 30/19* (2022.01)
*G06V 30/412* (2022.01)
*G06V 30/418* (2022.01)
*G06V 30/413* (2022.01)

(52) U.S. Cl.
CPC ........ *G06V 30/1916* (2022.01); *G06V 30/412* (2022.01); *G06V 30/413* (2022.01); *G06V 30/418* (2022.01)

(58) Field of Classification Search
CPC ............. G06K 9/00483; G06K 9/6262; G06K 9/00456; G06K 9/00449; G06V 30/418; G06V 30/1916; G06V 30/412; G06V 30/413

See application file for complete search history.

(56) References Cited

U.S. PATENT DOCUMENTS

| | | | |
|---|---|---|---|
| 2002/0168090 A1* | 11/2002 | Bruce | G06V 30/127 382/101 |
| 2015/0281739 A1* | 10/2015 | Russell | G06V 30/133 382/182 |

\* cited by examiner

*Primary Examiner* — Siamak Harandi
(74) *Attorney, Agent, or Firm* — Goodwin Procter LLP

(57) ABSTRACT

Techniques to determine document recognition errors are described. In one embodiment, an apparatus may comprise an image reception component operative to receive an incoming document image; a document recognition component operative to perform a document recognition process on the incoming document image to generate a recognized document; and collect document recognition process information for the document recognition process of the incoming document image; a document reconstruction component operative to generate a reconstructed document image based on the document recognition process information; and an image comparison component operative to compare the reconstructed document image to the incoming document image to generate document recognition performance information for the recognized document. Other embodiments are described and claimed.

20 Claims, 9 Drawing Sheets

US 11,727,701 B2

TECHNIQUES TO DETERMINE DOCUMENT RECOGNITION ERRORS

RELATED APPLICATIONS

This application is a continuation of, claims the benefit of and priority to previously filed U.S. patent application Ser. No. 16/373,423 filed Apr. 2, 2019, titled "TECHNIQUES TO DETERMINE DOCUMENT RECOGNITION ERRORS", which is hereby incorporated by reference in its entirety.

BACKGROUND

Various endeavors result in the creation of paper documents. These paper documents frequently comprise text, which may include one or more of handwritten text, typewritten text, and computer-generated text. These documents may further comprise images. These paper documents may be digitized, converted into a computerized form, and captured as a digital image. These digital images may be exchanged via various systems, such as telefacsimile, the Internet or other network, or the physical exchange of storage devices. As such, people may receive digital images representing physical documents that contain various kinds of text and images.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to determine document recognition errors. Some embodiments are particularly directed to techniques to determine document recognition errors using comparisons between received document images and reconstructed document images. In one embodiment, for example, an apparatus may comprise an image reception component operative to receive an incoming document image; a document recognition component operative to perform a document recognition process on the incoming document image to generate a recognized document; and collect document recognition process information for the document recognition process of the incoming document image; a document reconstruction component operative to generate a reconstructed document image based on the document recognition process information; and an image comparison component operative to compare the reconstructed document image to the incoming document image to generate document recognition performance information for the recognized document. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
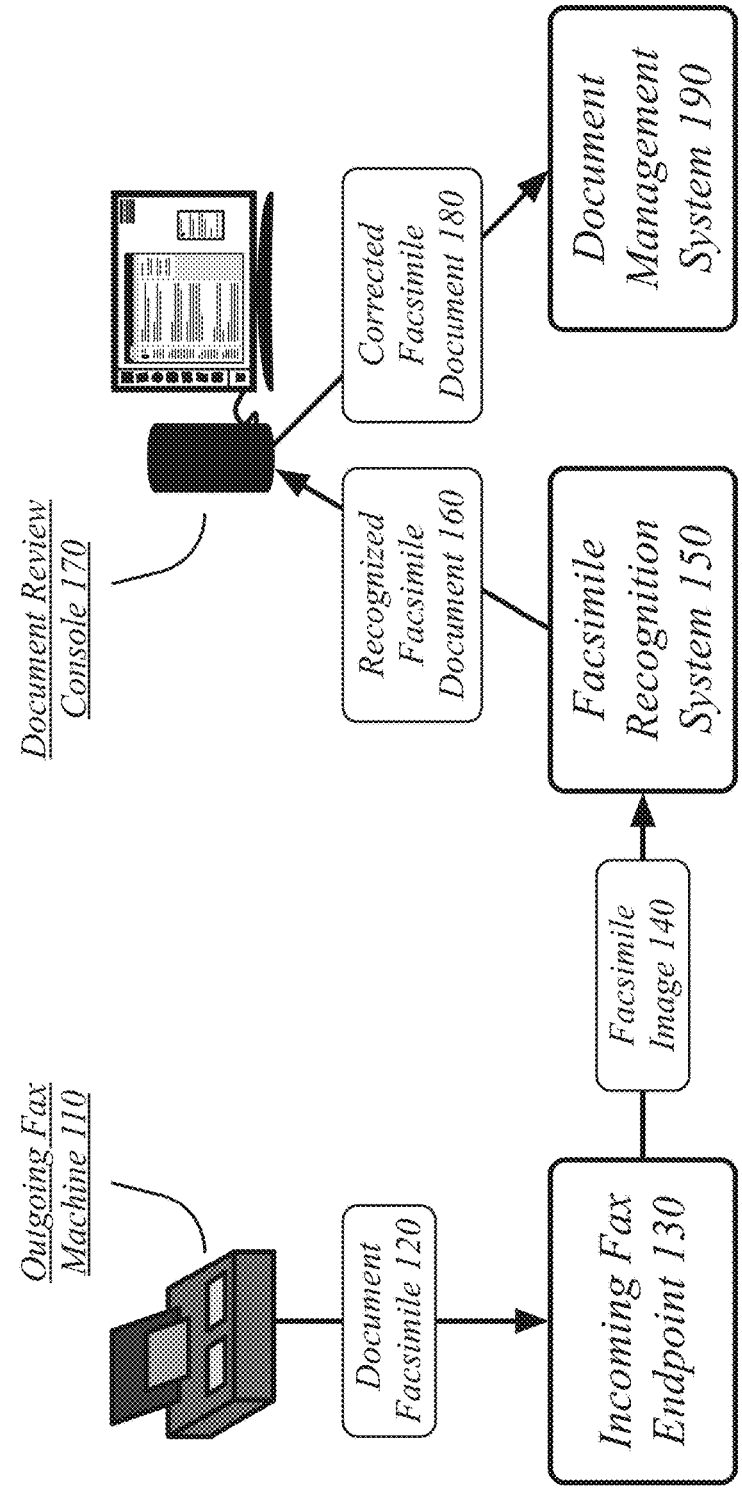
FIG. 1 illustrates an embodiment of a document recognition system.

Institutions regularly receive documents that, while generated using computer or typewriter fonts, are represented as computer images or in a physical form like paper, such that the text content is represented visually rather than as machine-encoded text. For instance, a document that has been scanned or sent as a facsimile may be received. However, the institutions may prefer to ultimately represent the document as machine-encoded text so as to empower the computer-aided processing of the text content of the document.

As such, received document images may be processed to generate recognized documents with machine-encoded text. Optical character recognition (OCR) techniques may be used for this process, including known OCR techniques. Particularly where form data is being recognized, the highest possible OCR accuracy is desirable. As such, techniques to improve the accuracy of an OCR process are beneficial to people relying on OCR in their handling of forms.

Particularly where important form data is being recognized, human operators may be used to check the accuracy of the machine-encoded text in recognized documents. For example, a single error in a recognized account number could result in significant problems if not caught. However, as forms may be long, human operators may use significant time to review recognized documents and may struggle to retain focus across dozens of document pages. As such, the operators may be aided by an OCR evaluation process that identifies possible problems in the recognized document, specific sub-portions of the document with identified potential errors, for them to compare to the original document image and possibly correct recognition errors.

A document recognition system may check for errors using a document reconstruction process. The document reconstruction process gathers information during the document recognition process. This gathered information is used to construct an image of what a received document should look like if the document recognition process is correct. This reconstructed image is then compared to an original document image to determine any areas that mismatch. These mismatching areas are highlighted to the human operator for evaluation. This may reduce the burden on human operators in checking an entire document and may improve their performance by focusing their attention on potential problems, thereby improving the accuracy of the document recognition process. As a result, the embodiments can improve the performance and affordability of a computerized document recognition system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a document recognition system 100. In one embodiment, the document recognition system 100 may comprise a computer-implemented system having software applications comprising one or more components. Although the document recognition system 100 shown in FIG. 1 has a limited number of elements in a certain topology, it may be appreciated that the document recognition system 100 may include more or less elements in alternate topologies as desired for a given implementation.

The embodiment of the document recognition system 100 illustrated in FIG. 1 may correspond to one possible flow of information through the document recognition system 100 in one application of the document recognition system 100 to a working environment. It will be appreciated that discussion of the functions of the document recognition system 100 in relation to FIG. 1 and other figures represents one possible embodiment of the document recognition system 100 and that the techniques described herein may be applied in other embodiments.

An outgoing fax machine 110 may be used to generate a document facsimile 120 sent to an incoming fax endpoint 130 for a person, business, or other entity. The incoming fax endpoint 130 may comprise a computer system operative to receive a document facsimile 120 sent and received using facsimile techniques. The outgoing fax machine 110 may comprise a standalone fax machine or a computer system operative to operate using facsimile techniques.

The incoming fax endpoint 130 stores a facsimile image 140 of the document. The facsimile image 140 comprises a digitized computer image representing an original document sent using the outgoing fax machine 110. The incoming fax endpoint 130 provides the facsimile image 140 to a facsimile recognition system 150. The facsimile recognition system 150 analyzes the facsimile image 140 and generates a recognized facsimile document 160. The recognized facsimile document 160 comprises machine-readable text elements generated based on recognizing text in the facsimile image 140.

The facsimile recognition system 150 provides the recognized facsimile document 160 to a document review console 170 for review by a human operator. The operator reviews the recognized facsimile document 160 in comparison with the facsimile image 140 to determine whether the machine-readable text of the recognized facsimile document 160 accurately represents the text of the original document represented in image form in the facsimile image 140. Based on the judgment of the operator, the document review console 170 may be used to modify the recognized facsimile document 160 into a corrected facsimile document 180 by specifying one or more corrections to the machine-readable text of the recognized facsimile document 160.

The document review console 170 then saves the corrected facsimile document 180 in a document management system 190 as a canonical representation of the original document, and the received document facsimile 120, within the document recognition system 100. The machine-readable text of the corrected facsimile document 180 may then be used by retrieving the corrected facsimile document 180. The machine-readable text may be used by the receiving party for whatever purpose intended by the sending of the original document facsimile 120 to them by the sender.

Figure 2A:
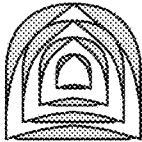
FIG. 2A illustrates an embodiment of an original document image.

FIG. 2A illustrates an embodiment of an original document image 200.

The original document image 200 may correspond to the facsimile image 140 described with reference to FIG. 1. The original document image 200 comprises a computer image analyzed by a facsimile recognition system 150 to determine its text content and interpret the text content into machine-readable text. The original document 200 may include various elements, including a logo 210, a signature element 230 comprising a signature, and one or more text elements 220. The one or more text elements 220 consist of text entered on the original document using an original font, such as through a typewriter or computer. In some embodiments, the one or more text elements 220 may contain handwritten text. The signature element 230 contains a handwritten signature written on the original document.

Figure 2B:
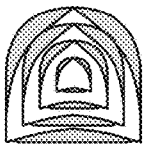
FIG. 2B illustrates an embodiment of a known document form.

FIG. 2B illustrates an embodiment of a known document form 250.

The known document form 250 may comprise a computerized form stored by the document recognition system 100 for use in recognizing documents and converting their text content into machine-readable text. The known document form 250 includes various known elements, including a form logo 260, a form signature area 230, and one or more form text areas 270. The form logo 260 is a known area where a particular logo is placed on a particular form or may, in some cases, be a known area where different logos are used when the same base form is used by multiple different entities. The form signature area 230 is a known area where a signature field is known to be. The form text areas 270 comprise the known locations of one or more text fields, where text elements will be expected to be found in a filled-out form.

Figure 3A:
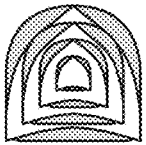
FIG. 3A illustrates an embodiment of a recognized document.

FIG. 3A illustrates an embodiment of a recognized document 300.

The document recognition system 100 generates a recognized document 300 based on the recognized elements of the original document image 200. The recognized document 300 is a machine-readable version of the original document image 200 constructed from the known document form 250 and the recognized elements of the original document image 200. The recognized document 300 comprises text fields, some of which may have been correctly identified—such as correctly-identified text field 320—and some of which may have been incorrectly identified—such as misidentified text field 330. Determining which fields are correctly identified and which are misidentified may be performed using the techniques described herein.

Figure 3B:
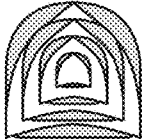
FIG. 3B illustrates an embodiment of a reconstructed document image.

FIG. 3B illustrates an embodiment of a reconstructed document image 350.

The reconstructed document image 350 comprises an attempted reconstruction of the original document image 200 based on the known document form 250 and the elements identified—whether correctly or incorrectly—from the original document image 200. As shown in FIG. 3B, in the illustrated embodiment, the reconstructed document image 350 comprises a reconstructed misidentified text element 360 as well as a plurality of correctly-identified text elements. When the reconstructed document image 350 is compared to the original document image 200 this reconstructed misidentified text element 360 will be detected and highlighted to an operator for determination as to whether the mismatch with the original document image 200 is a result of an incorrect identification of the original text.

Figure 4:
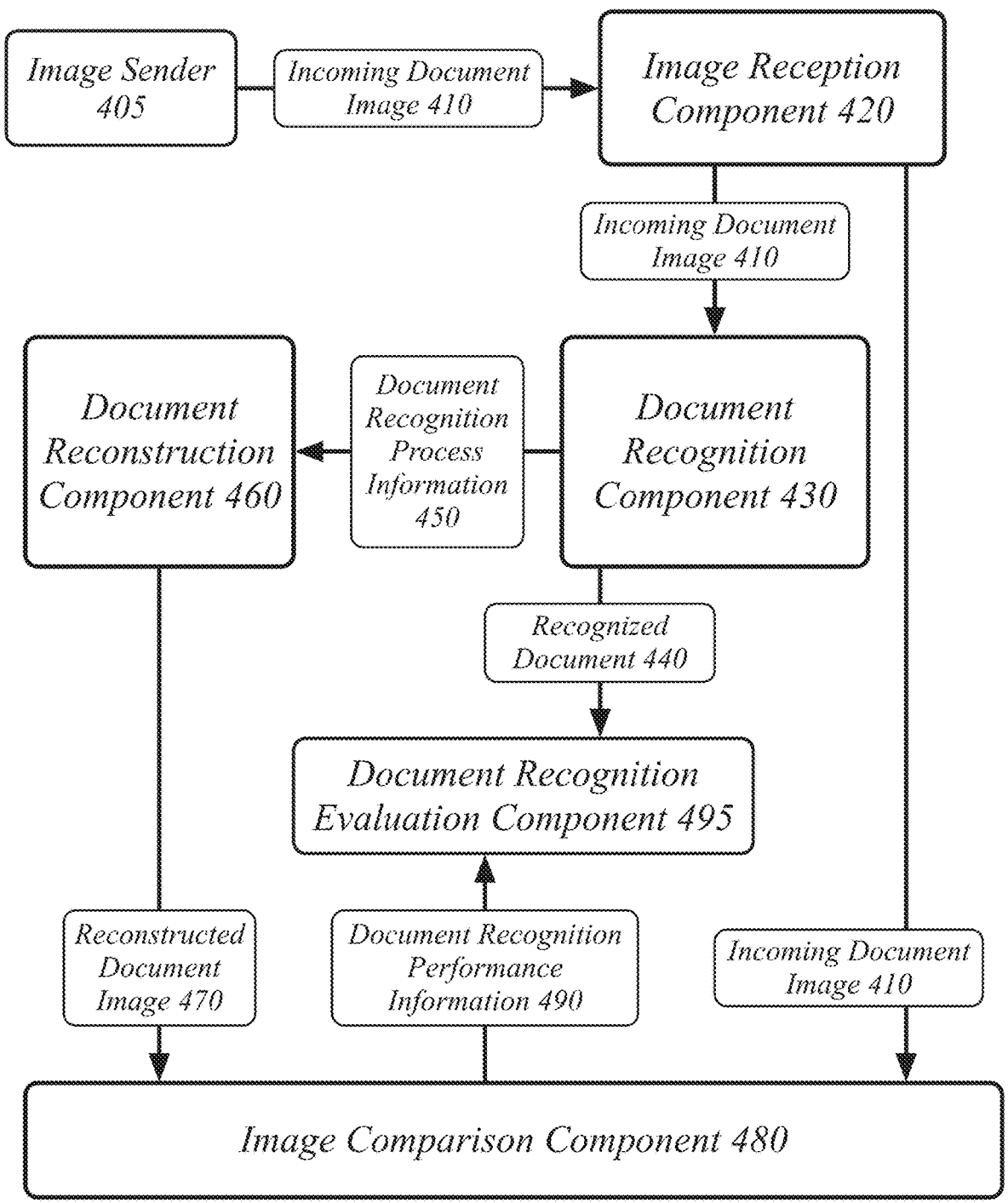
FIG. 4 illustrates an embodiment of the document recognition system performing an incoming document reconstruction and comparison.

FIG. 4 illustrates an embodiment of the document recognition system 100 performing an incoming document reconstruction and comparison.

An image sender 405 submits an incoming document image 410 to the document recognition system 100. The image sender 405 may comprise anyone submitting a filled-out form in an image format. The incoming document image 410 may comprise a scanned document image or a telefacsimile image, such as may be sent by an outgoing fax machine 110. An image reception component 420 receives the incoming document image 410. Where the received incoming document image 410 is a telefacsimile image, the image reception component 420 may comprise an incoming fax endpoint 130. The image reception component 420 may generally comprise any software component operative to receive document images into the document recognition system 100.

The image reception component 420 provides the incoming document image 410 to a document recognition component 430. The document recognition component 430 performs a document recognition process on the incoming document image 410 to generate a recognized document 440. The recognized document 440 comprises machine-readable text and identified image elements (e.g., one or more signatures, one or more logos) corresponding to the attempt by the document recognition component 430 to identify the content of the incoming document image 410. The document recognition component 430 may generally operate according to known document-recognition techniques, including known optical character recognition (OCR) techniques, with additional elements to empower the document reconstruction and therefore the document recognition evaluation process.

The document recognition component 430 also collects document recognition process information 450 for the document recognition process of the incoming document image 410, which it provides to a document reconstruction component 460. The document recognition process information 450 comprises information identified by the document recognition component 430 that, while some of it might not be included in the recognized document, was identified as part of recognizing the content of the incoming document image 410 to generate the recognized document 440. The document recognition process information 450 may comprise one or more of font substitution records, graphic element records, signature element records, and text element records.

A text element record indicates the identified text content of the incoming document image 410 as machine-readable text. Each text element record comprises machine-readable text identified in the incoming document image 410. Each text element record comprises a detected location in the incoming document image 410 where the text content was detected. The one or more text elements records indicate for each record which of the text fields of the recognized document 440 contain each text element. These text fields may comprise known text fields of a known form. The one or more text element records are used in generating the reconstructed document image 470 to recreate within it the text identified from the incoming document image 410.

A font substitution record indicates where a recognized font from the incoming document image 410 is replaced by a different font in generating the recognized document 440, as the document recognition component 430 may be configured to generate recognized documents using a standardized font. The one or more font substitution records are used to create a reconstructed document image 470 with the original font believed by the document recognition component 430 to have been used in generating the original document represented in the incoming document image 410. The one or more font substitution records indicate for each record which of the text fields of the recognized document 440 were made using each recognized original font, as may be relevant where multiple fonts were used in generating the original document. These text fields may comprise known text fields of a known form. Each font substitution record may be linked to one or more text element records indicating the one or more text elements using an original font in the incoming document image 410.

A graphic element record indicates a graphic element, such as a logo, recognized in the incoming document image 410. A graphic element record comprises the associated graphic element as an image. The one or more graphic elements from the one or more graphic element records will be used in creating the reconstructed document image 470. The one or more graphic element records indicate the positions in the incoming document image 410 at which the graphic elements were identified, such that they may be placed in the same position in the reconstructed document image 470.

A signature element record indicates an identified signature in the incoming document image 410. A signature element record indicates the position in the incoming document image 410 at which it was detected. The signature elements may be detected in known signature fields of a known form. A signature element record comprises the associated signature as an image. The one or more signature element records will be used in creating the reconstructed document image 470 by placing the image of the detected signature at the location detected in the incoming document image 410.

The document recognition process performed by the document recognition component 430 may proceed in a plurality of phases. The document reconstruction component 460 collects the document recognition process information 450 for these phases and uses it in the generation of the reconstructed document image 470. The document recognition process may comprise a document region identification phase, a region type identification phase, a region processing phase, and a recognized document assembly phase.

The document region identification phase comprises identifying a plurality of document regions in the incoming document image 410. In some embodiments, identifying the document regions may comprise identifying a known form associated with the incoming document image 410 based on visual characteristics of the known form. The known form stored by the document recognition system 100 may have identified document regions stored in association with it. The document recognition component 430 may retrieve known form information and use that known form information to identify the plurality of document regions by matching location information for the plurality of document regions for the known form to the corresponding locations in the incoming document image 410. Alternatively, in other embodiments, document regions may be identified using optical recognition techniques.

The region processing phase comprises identifying the content of each identified document region. Optical character recognition techniques may be used in the region processing phase to identify text content in each of the identified document regions. The region process phase generates machine-readable text, isolated images of graphical elements and signatures, and information about the composition of the original document represented in the incoming document image 410.

The recognize document assembly phase comprises generating the recognized document 440 for use by the document recognition system 100 based on the content identified in the region processing phase. The identified content—including machine-readable textual content, graphical elements, and signature images—is assembled into a machine-readable recognized document 440 and provided to the document recognition evaluation component 495. In some cases, the recognized document assembly phase may be based on assembling a plurality of processed document regions into a retrieved document template identified from the incoming document image 410. The incoming document image 410 may be identified as being based on a particular known form, with a form template retrieved for that known form in response. That form template may then have the content identified in the region processing phase placed into it to form the recognized document 440. That form template may further be used, with the content identified in the region processing phase and the document recognition process information 450, to generate the reconstructed document image 470.

A document reconstruction component 460 generates a reconstructed document image 470 based on the document recognition process information 450. The document reconstruction component 460 retrieves a document template based on an identified form for the incoming document image 410. The content identified by the document recognition component 340 is aligned in the template according to layout information of the document recognition process information 450 and formatted according to formatting information of the document recognition process information 450. The layout information corresponds to the identified positioning of the identified content. The formatting information comprises the identified formatting (e.g., font, font size) of the identified content. The layout and formatting identified for the incoming document image 410 is reproduced for the machine-readable text identified for the recognized document 440 by the document recognition component 430 to generate the reconstructed document image 470. The reconstructed document image 470 may be generated by entering the identified content in a document template using the determined positioning and formatting, and then converting the document into an image, such as might be performed using known image export techniques that render documents containing machine-readable text into a document image.

An image comparison component 480 compares the reconstructed document image 470 to the incoming document image 410 to generate document recognition performance information 490 for the recognized document 440. The image comparison component 480 uses image comparison techniques, such as known image comparison techniques, to determine portions of the reconstructed document image 470 that mismatch the incoming document image 410. The image comparison techniques may determine portions of the reconstructed document image 470 that mismatch the incoming document image 410 beyond defined tolerances. The image comparison techniques compare corresponding portions of the incoming document image 410 and reconstructed document image 470 to determine where the corresponding portions differ. In some embodiments, the portions compared may correspond to the known fields of a known form. In other embodiments, the image comparison may be performed without reference to the layout of the known form.

The document recognition process information 450 identifies a plurality of document regions of the incoming document image, corresponding to various fields of a known form. The document recognition performance information 490 identifies one or more image mismatches between corresponding portions of the incoming document image 410 and the reconstructed document image 470. The image comparison component 480 maps the one or more image mismatches to one or more mismatching document regions of the plurality of document regions by comparing the locations of the image mismatches to the known document regions for a known form to determine which of the known document regions correspond to each of the image mismatches.

The document recognition performance information 490 is then provided to a document recognition evaluation component 495. The document recognition performance information 490 identifies the one or more image mismatches and one or more mismatching document regions to the document recognition evaluation component 495 for use in evaluating the recognized document 440. Providing the recognized document 440 and document recognition performance information 490 to the document recognition evaluation component 495 corresponds generally to the facsimile recognition system 150 providing the recognized facsimile document 160, with associated information for the evaluation of the quality of the recognized facsimile document 160, to the document review console 170.

In some embodiments, the document recognition evaluation component 495 comprises an automated evaluation component. An automated document recognition evaluation component 495 may use automated techniques with the document recognition performance information 490 to improve the recognized document 440. For instance, document regions with corresponding image mismatches may be re-analyzed to determine an alternative interpretation of the corresponding portions of the incoming document image 410. A replacement reconstructed document image may be generated based on an alternative recognized document and associated alternative document recognition process information using the described techniques on the alternative interpretation of those portions. This replacement reconstructed document image may then be compared to the incoming document image 410 to generate revised document recognition performance information for the replacement reconstructed document image and therefore the alternative recognized document. This process may be iterated until no image mismatches are detected or no alternative interpretations are available, which may result in a human operator being requested to perform a human evaluation of any mismatching document regions remaining for the incoming document image 410.

In some embodiments, the document recognition evaluation component 495 comprises or connects to a document review console 170 in which a human operator is empowered to evaluate a recognized document 440 with assistance from the document recognition performance information 490. In some embodiments, a recognized document 440 may be presented to a human operator after a single iteration of generating a recognized document 440 and reconstructed document image 470. In other embodiments, a recognized document 440 may be presented to a human operator after one or more iterations of generating a recognized document 440 and reconstructed document image 470, with the recognized document 440 only provided to a human operator if image mismatches are found for the recognized document 440 or if no progress in reducing image mismatches is found after one or more iterations of attempted improvement. In some embodiments, a recognized document 440 may be presented to a human operator after a plurality of iterations of generating a recognized document 440 and reconstructed document image 470, with the recognized document 440 provided to the human operator whether or not image mismatches are found for the final iteration of the recognized document 440.

As such, the document recognition evaluation component 495 may display the recognized document 440 in a document recognition evaluation interface of a document review console 170. The document recognition evaluation component 495 displays the one or more image mismatches in association with document region highlighting of the one or more mismatching document regions in the document recognition evaluation interface. Document region highlighting may comprise any technique to draw attention or focus to a particular portion of a displayed document. The human operator's attention is drawn to these particular document regions to request that they determine if the machine-readable text determined by the document recognition component 430 in generating the recognized document 440 is correct. If the machine-readable text is correct, the operator may specify that it is correct, verifying it. If the machine-readable text is not correct, the operator may specify that it is incorrect, provide a correction, and/or indicate that the incoming document image 410 is indeterminate, unclear, or otherwise not prone to determination as to at least a portion of its content.

The document recognition evaluation component 495 may receive one or more operator corrections to the recognized document 440 from the operator. The one or more operator corrections correspond to the one or more mismatching document regions, correcting the machine-readable text based on their evaluation of the original incoming document image 410. The document recognition evaluation component 495 updates the recognized document 440 in the one or more mismatching document regions based on the one or more operator corrections, modifying the machine-readable text for the one or more mismatching document regions. The document recognition component 495 then stores the updated recognized document as the canonical machine-readable version of the incoming document image 410. The updated recognized document may then be used for various further activities of the entity executing the document recognition system 100.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
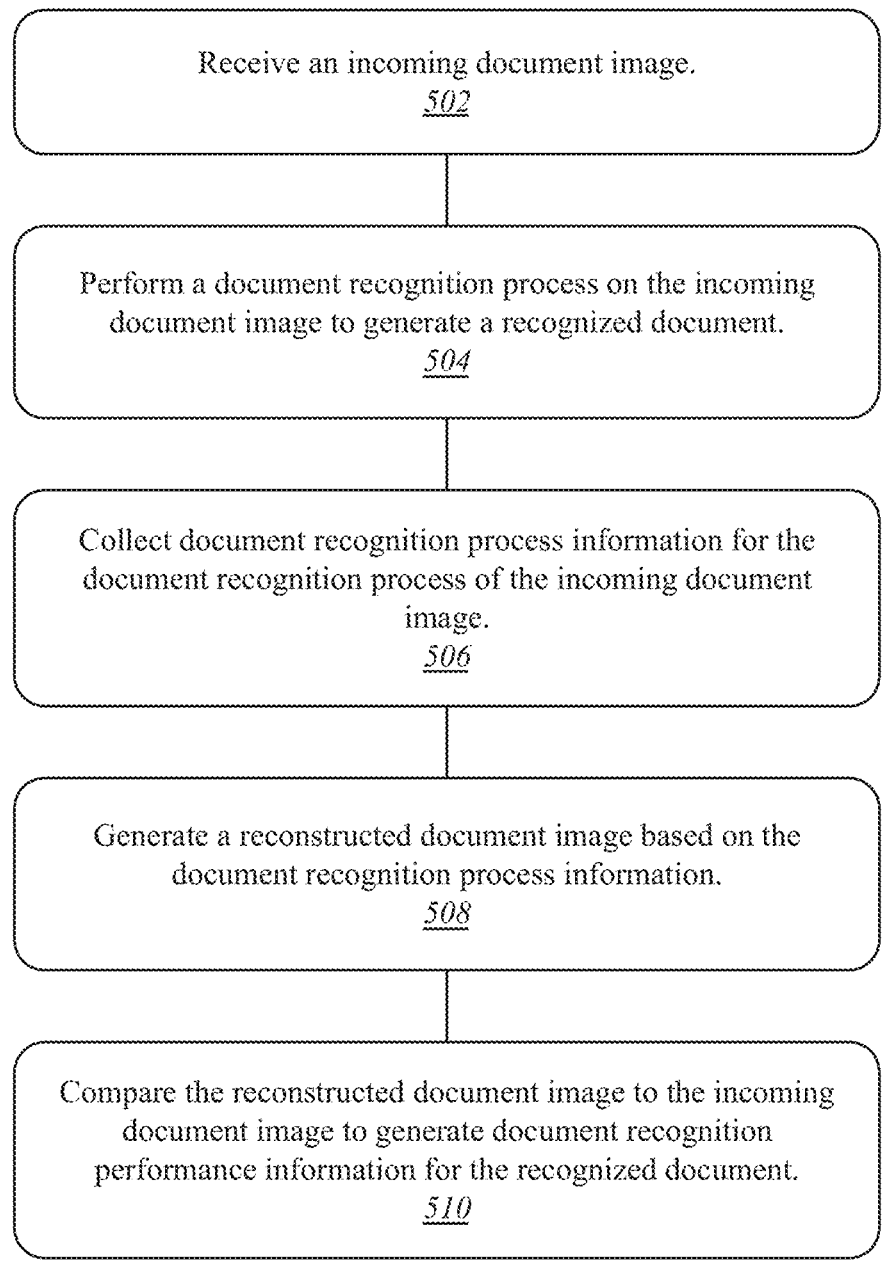
FIG. 5 illustrates an embodiment of a logic flow for the system of FIG. 1.

FIG. 5 illustrates one embodiment of a logic flow 500. The logic flow 500 may be representative of some of or all of the operations executed by one or more embodiments described herein.

In the illustrated embodiment shown in FIG. 5, the logic flow 500 may receive an incoming document image at block 502.

The logic flow 500 may perform a document recognition process on the incoming document image to generate a recognized document at block 504.

The logic flow 500 may collect document recognition process information for the document recognition process of the incoming document image at block 506.

The logic flow 500 may generate a reconstructed document image based on the document recognition process information at block 508.

The logic flow 500 may compare the reconstructed document image to the incoming document image to generate document recognition performance information for the recognized document at block 510.

The embodiments are not limited to this example.

Figure 6:
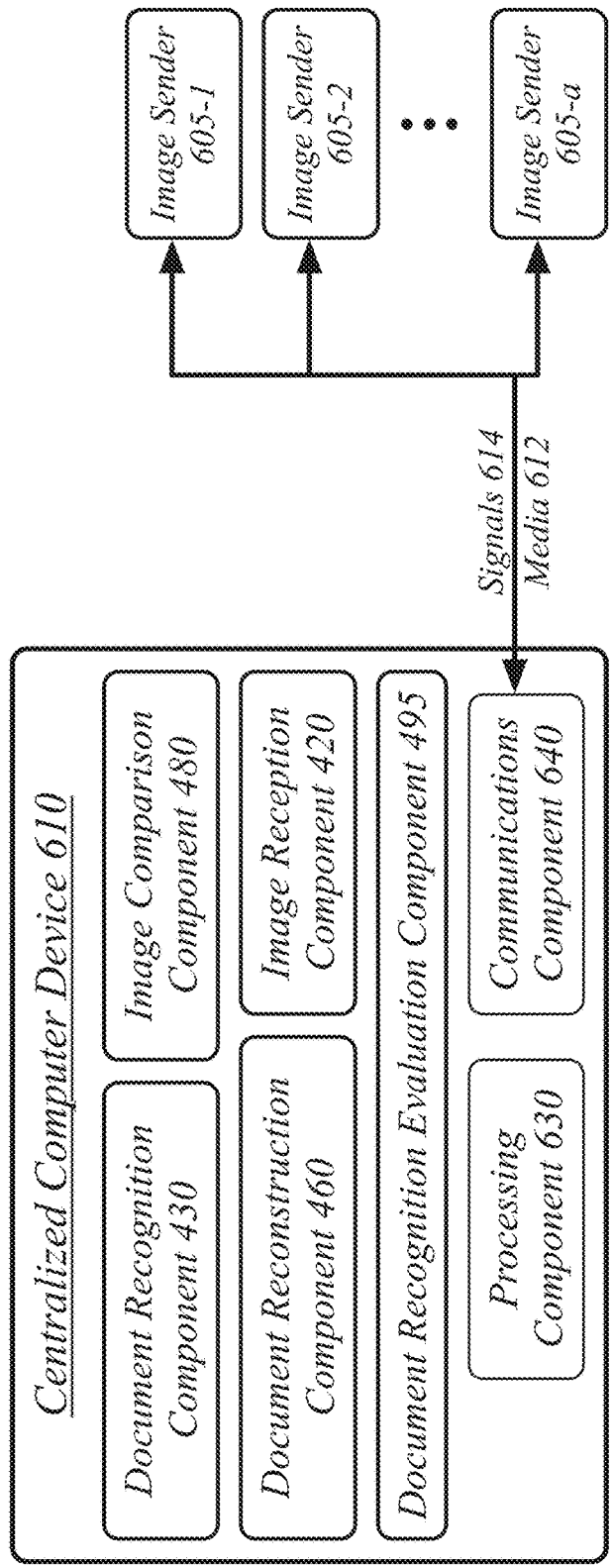
FIG. 6 illustrates an embodiment of a centralized system for the system of FIG. 1.

FIG. 6 illustrates a block diagram of a centralized system 600. The centralized system 600 may implement some of or all of the structure and/or operations for the document recognition system 100 in a single computing entity, such as entirely within a single centralized computer device 610.

The centralized computer device 610 may comprise any electronic device capable of receiving, processing, and sending information for the document recognition system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized computer device 610 may execute processing operations or logic for the document recognition system 100 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized computer device 610 may execute communications operations or logic for the document recognition system 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 612 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized computer device 610 may communicate with other devices 605 over a communications media 612 using communications signals 614 via the communications component 640. The centralized computer device 610 may execute the document recognition system 100 in a single computing entity, such that the image reception component 420, document recognition component 430, document reconstruction component 460, image comparison component 480, and document recognition evaluation component 495 all execute on a single centralized computer device 610. For instance, the document recognition system 100 may execute as a document recognition application on the centralized computer device 610. The centralized computer device 610 is operative to receive various incoming document images, such as may include document facsimiles, from one or more image senders 605 submitting document images to them, and then use the document recognition techniques therein to identify the content of the received document images.

Figure 7:
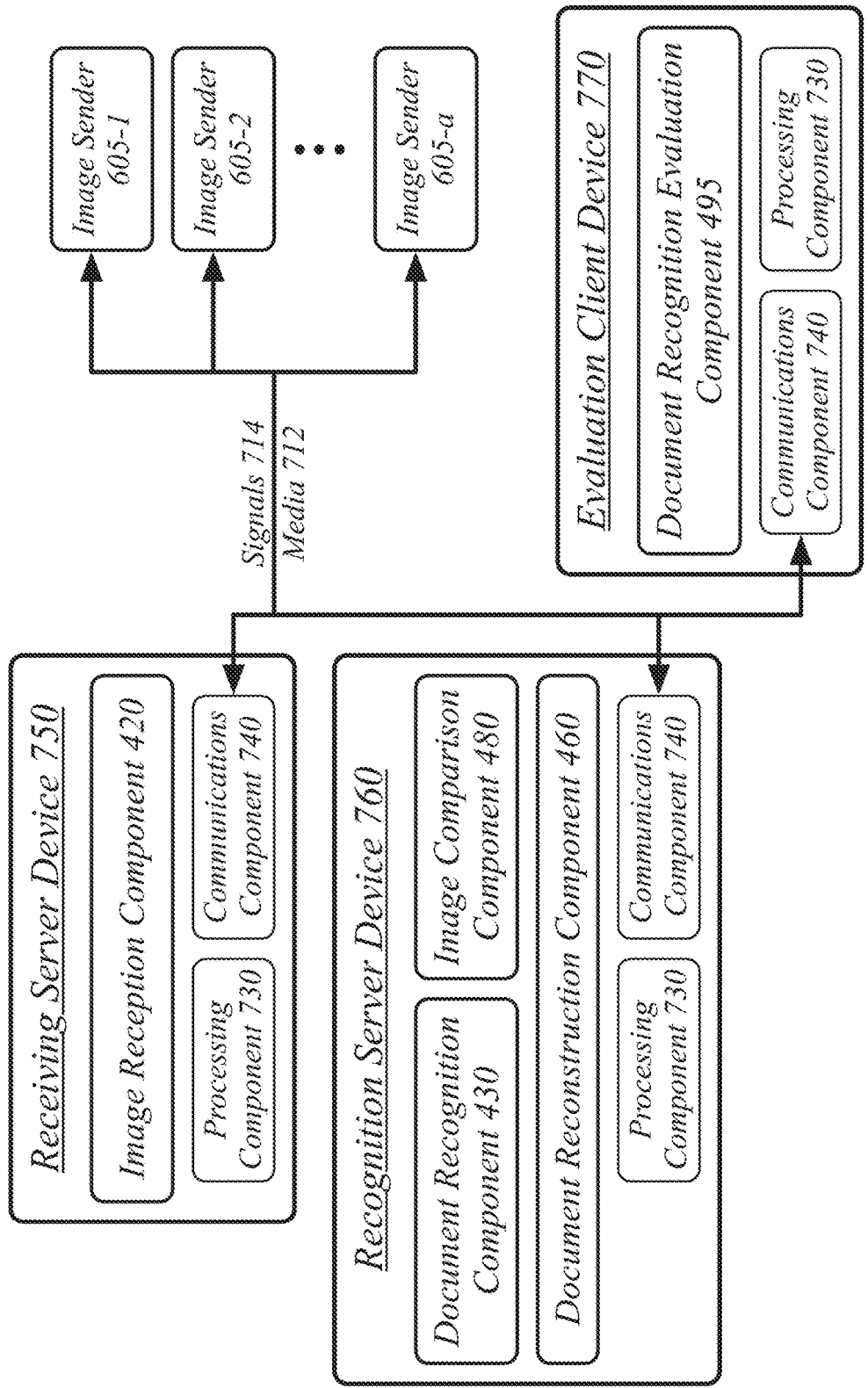
FIG. 7 illustrates an embodiment of a distributed system for the system of FIG. 1.

FIG. 7 illustrates a block diagram of a distributed system 700. The distributed system 700 may distribute portions of the structure and/or operations for the document recognition system 100 across multiple computing entities. Examples of distributed system 700 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 700 may comprise a plurality of server devices 750, 760, 770. In general, the server devices 750, 760, 770 may be the same or similar to the centralized computer device 610 as described with reference to FIG. 6. For instance, the server devices 750, 760, 770 may each comprise a processing component 730 and a communications component 740 which are the same or similar to the processing component 630 and the communications component 640, respectively, as described with reference to FIG. 6. In another example, the server devices 750, 760, 770 may communicate over a communications media 712 using communications signals 714 via the communications components 740.

A receiving server device 750 may comprise or employ one or more programs that operate to perform various methodologies in accordance with the described embodiments. In one embodiment, for example, the receiving server device 750 may execute an image reception component 420. In general, the receiving server device 750 may comprise an externally-available endpoint or gateway server device for external devices to access the distributed system 700. The receiving server device 750 may comprise one of a plurality of server devices performing gateway operations for the distributed system 700. The receiving server device 750 may be externally available to the various image senders 605 to submit document images to the distributed system 700 and may receive any incoming document images for processing by the document recognition system 100.

A recognition server device 760 may comprise or employ one or more programs that operate to perform various methodologies in accordance with the described embodiments. In one embodiment, for example, the recognition server device 760 may execute a document recognition component 430, document reconstruction component 460, and image comparison component 480. The recognition server device 760 may comprise an internal server device of the distributed system 700 operative to execute work for users of the distributed system 700. In some embodiments, a recognition server device 760 may comprise a dedicated recognition server device 760. In other embodiments, a recognition server device 760 may execute a variety of tasks, with document recognition tasks a subset of the total tasks executed on the recognition server device 760. A recognition server device 760 may comprise only one of a plurality of recognition server devices and/or worker server devices. The recognition server device 760 may receive document images received at the distributed system 700 via a receiving server device 750 and generate recognized documents with associated document recognition performance information for evaluation by a document recognition evaluation component 495 at an evaluation client device 750.

An evaluation client device 750 may comprise or employ one or more programs that operate to perform various methodologies in accordance with the described embodiments. In one embodiment, for example, the evaluation client device 770 may execute a document recognition evaluation component 495. The evaluation client device 750 may comprise one of a plurality of client devices used by human operators to evaluate and improve recognized documents, corresponding to the document review console 170 described with reference to FIG. 1. The evaluation client devices are provided with recognized documents, with associated document recognition performance information, in order to receive checked, verified, and corrected documents from the operators.

Figure 8:
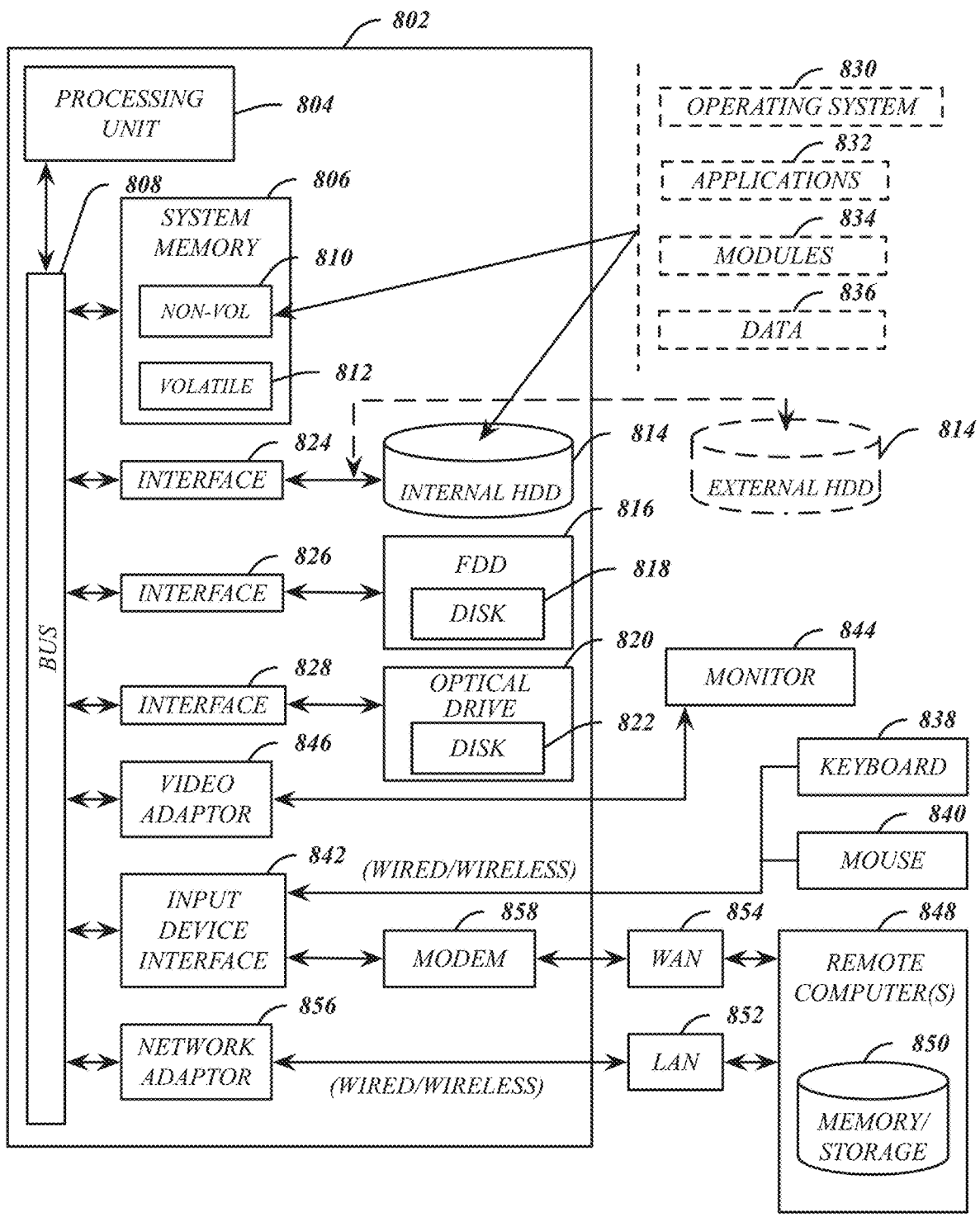
FIG. 8 illustrates an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the document recognition system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many of or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
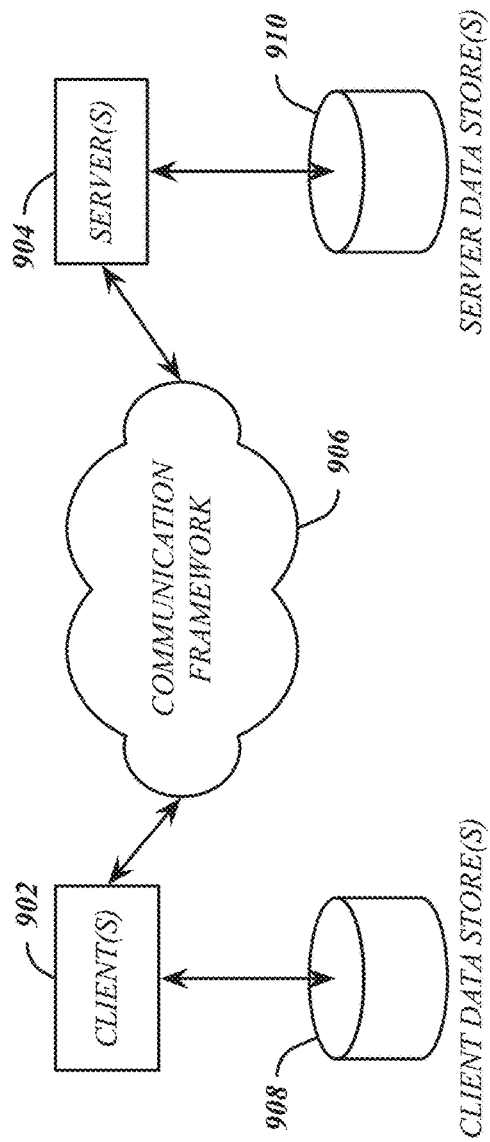
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may correspond to various image senders and/or document review consoles. The servers 904 may implement one or more servers executing document recognition operations. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

A computer-implemented method may comprise receiving an incoming document image; performing a document recognition process on the incoming document image to generate a recognized document; collecting document recognition process information for the document recognition process of the incoming document image; generating a reconstructed document image based on the document recognition process information; and comparing the reconstructed document image to the incoming document image to generate document recognition performance information for the recognized document.

A computer-implemented method may further comprise the incoming document image comprising one of a telefacsimile image or a scanned document image.

A computer-implemented method may further comprise the document recognition process information identifying a plurality of document regions of the incoming document image, the document recognition performance information identifying one or more image mismatches, further comprising: mapping the one or more image mismatches to one or more mismatching document regions of the plurality of document regions.

A computer-implemented method may further comprise displaying the recognized document in a document recognition evaluation interface; and displaying the one or more image mismatches in association with document region highlighting of the one or more mismatching document regions in the document recognition evaluation interface.

A computer-implemented method may further comprise receiving one or more operator corrections to the recognized document, the one or more operator corrections corresponding to the one or more mismatching document regions; updating the recognized document in the one or more mismatching document regions based on the one or more operator corrections; and storing the updated recognized document.

A computer-implemented method may further comprise the document recognition process information comprising one or more of font substitution records, graphic element records, signature element records, and text element records.

A computer-implemented method may further comprise the document recognition process comprising a document region identification phase, a region type identification phase, a region processing phase, and a recognized document assembly phase, the recognized document assembly phase based on assembling a plurality of processed document regions into a retrieved document template identified from the incoming document image.

An apparatus may comprise an image reception component operative to receive an incoming document image; a document recognition component operative to perform a document recognition process on the incoming document image to generate a recognized document; and collect document recognition process information for the document recognition process of the incoming document image; a document reconstruction component operative to generate a reconstructed document image based on the document recognition process information; and an image comparison component operative to compare the reconstructed document image to the incoming document image to generate document recognition performance information for the recognized document. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method performed by a processor, comprising:
   receiving an incoming document image;
   performing a document recognition process on the incoming document image to generate a recognized document;
   collecting document recognition process information for the document recognition process of the incoming document image;
   generating a reconstructed document image based on the document recognition process information; and
   with the processor, comparing the reconstructed document image to the incoming document image to generate document recognition performance information for the recognized document.

2. The method of claim 1, the incoming document image comprising one of a telefacsimile image or a scanned document image.

3. The method of claim 1, the document recognition process information identifying a plurality of document regions of the incoming document image, the document recognition performance information identifying one or more image mismatches, further comprising:
   mapping the one or more image mismatches to one or more mismatching document regions of the plurality of document regions.

4. The method of claim 3, further comprising:
   displaying the recognized document in a document recognition evaluation interface; and
   displaying the one or more image mismatches in association with document region highlighting of the one or more mismatching document regions in the document recognition evaluation interface.

5. The method of claim 4, further comprising:
   receiving one or more operator corrections to the recognized document, the one or more operator corrections corresponding to the one or more mismatching document regions;
   updating the recognized document in the one or more mismatching document regions based on the one or more operator corrections; and
   storing the updated recognized document.

6. The method of claim 1, the document recognition process information comprising one or more of font substitution records, graphic element records, signature element records, and text element records.

7. The method of claim 1, the document recognition process comprising a document region identification phase, a region type identification phase, a region processing phase, and a recognized document assembly phase, the recognized document assembly phase based on assembling a plurality of processed document regions into a retrieved document template identified from the incoming document image.

8. An apparatus, comprising:
   an image reception component operative to receive an incoming document image;
   a document recognition component operative to perform a document recognition process on the incoming document image to generate a recognized document; and collect document recognition process information for the document recognition process of the incoming document image;
   a document reconstruction component operative to generate a reconstructed document image based on the document recognition process information; and
   an image comparison component operative to compare the reconstructed document image to the incoming document image to generate document recognition performance information for the recognized document.

9. The apparatus of claim 8, the incoming document image comprising one of a telefacsimile image or a scanned document image.

10. The apparatus of claim 8, the document recognition process information identifying a plurality of document regions of the incoming document image, the document recognition performance information identifying one or more image mismatches, further comprising:
    the document recognition component operative to map the one or more image mismatches to one or more mismatching document regions of the plurality of document regions.

11. The apparatus of claim 10, further comprising:
    a document recognition evaluation component operative to display the recognized document in a document recognition evaluation interface; and display the one or more image mismatches in association with document region highlighting of the one or more mismatching document regions in the document recognition evaluation interface.

12. The apparatus of claim 11, further comprising:
    the document recognition evaluation component operative to receive one or more operator corrections to the recognized document, the one or more operator corrections corresponding to the one or more mismatching document regions;

update the recognized document in the one or more mismatching document regions based on the one or more operator corrections; and store the updated recognized document.

13. The apparatus of claim 8, the document recognition process information comprising one or more of font substitution records, graphic element records, signature element records, and text element records.

14. The apparatus of claim 8, the document recognition process comprising a document region identification phase, a region type identification phase, a region processing phase, and a recognized document assembly phase, the recognized document assembly phase based on assembling a plurality of processed document regions into a retrieved document template identified from the incoming document image.

15. At least one non transitory computer-readable storage medium comprising instructions that, when executed, cause a system to:
  receive an incoming document image;
  perform a document recognition process on the incoming document image to generate a recognized document;
  collect document recognition process information for the document recognition process of the incoming document image;
  generate a reconstructed document image based on the document recognition process information; and
  compare the reconstructed document image to the incoming document image to generate document recognition performance information for the recognized document.

16. The non-transitory computer-readable storage medium of claim 15, the incoming document image comprising one of a telefacsimile image or a scanned document image.

17. The non-transitory computer-readable storage medium of claim 15, the document recognition process information identifying a plurality of document regions of the incoming document image, the document recognition performance information identifying one or more image mismatches, comprising further instructions that, when executed, cause a system to:
  map the one or more image mismatches to one or more mismatching document regions of the plurality of document regions.

18. The non-transitory computer-readable storage medium of claim 17, comprising further instructions that, when executed, cause a system to:
  display the recognized document in a document recognition evaluation interface; display the one or more image mismatches in association with document region highlighting of the one or more mismatching document regions in the document recognition evaluation interface;
  receive one or more operator corrections to the recognized document, the one or more operator corrections corresponding to the one or more mismatching document regions;
  update the recognized document in the one or more mismatching document regions based on the one or more operator corrections; and
  store the updated recognized document.

19. The non-transitory computer-readable storage medium of claim 15, the document recognition process information comprising one or more of font substitution records, graphic element records, signature element records, and text element records.

20. The non-transitory computer-readable storage medium of claim 15, the document recognition process comprising a document region identification phase, a region type identification phase, a region processing phase, and a recognized document assembly phase, the recognized document assembly phase based on assembling a plurality of processed document regions into a retrieved document template identified from the incoming document image.

* * * * *